US011358723B2

(12) United States Patent
Ruiz Lara et al.

(10) Patent No.: US 11,358,723 B2
(45) Date of Patent: Jun. 14, 2022

(54) SEAT ASSEMBLY WITH INDEPENDENT SEAT BOTTOM TILT (71) Applicant: Safran Seats USA LLC, Gainesville, TX (US)

(72) Inventors: Oscar Ruiz Lara, Versailles (FR); Arthur Glain, Boulogne-Billancourt (FR)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/059,200

(22) PCT Filed: Aug. 29, 2018

(86) PCT No.: PCT/IB2018/056600
§ 371 (c)(1),
(2) Date: Nov. 25, 2020

(87) PCT Pub. No.: WO2019/229511
PCT Pub. Date: Dec. 5, 2019

(65) Prior Publication Data
US 2021/0197972 A1 Jul. 1, 2021

Related U.S. Application Data (60) Provisional application No. 62/677,950, filed on May 30, 2018.

(51) Int. Cl.
*B60N 2/18* (2006.01)
*B64D 11/06* (2006.01)
(52) U.S. Cl.
CPC .......... *B64D 11/064* (2014.12); *B60N 2/1842* (2013.01); *B64D 11/0641* (2014.12); *B64D 11/0648* (2014.12)

(58) Field of Classification Search
CPC .... B64D 11/0641; B60N 2/1842; B60N 2/10; A47C 3/0257; A47C 3/026
(Continued)

(56) References Cited

U.S. PATENT DOCUMENTS 5,058,954 A * 10/1991 Kan-Chee .............. B60N 2/646
297/317
5,628,547 A * 5/1997 Matsumiya ............ B60N 2/242
297/354.11

(Continued)

FOREIGN PATENT DOCUMENTS

AT 522122 A1 * 8/2020 ............. A47C 7/024
DE 102006037521 A1 5/2007
(Continued)

OTHER PUBLICATIONS

International Patent Application No. PCT/IB2018/056600, Search Report and Written Opinion, dated Feb. 25, 2019.

*Primary Examiner* — Timothy J Brindley
(74) *Attorney, Agent, or Firm* — Kilpatrick Townsend & Stockton LLP (57) ABSTRACT Described are passenger seats (102) having a seat bottom (122) connected to the seat frame (108) at a hinge (130) at an aft portion of the seat bottom (122), and having a release mechanism (132) operably connected with the seat bottom (122) that, when actuated by a user, cause the seat bottom (122) to be released from a locked configuration to an unlocked configuration, whereby the seat bottom (122) is free to rotate downward, independent of a seat back (142), about the hinge (130) to a tilted position in order to increase a range of available angles between the seat bottom (122) and seat back (130).

19 Claims, 5 Drawing Sheets

(58) Field of Classification Search
USPC .......................................................... 297/313
See application file for complete search history.

(56) References Cited

U.S. PATENT DOCUMENTS

| | | | | |
|---|---|---|---|---|
| 5,722,726 | A * | 3/1998 | Matsumiya | B60N 2/242 |
| | | | | 297/322 |
| 6,036,266 | A * | 3/2000 | Massara | B60N 2/10 |
| | | | | 297/328 |
| 6,152,533 | A | 11/2000 | Smuk | |
| 6,695,406 | B2 * | 2/2004 | Plant | B60N 2/34 |
| | | | | 297/423.26 |
| 8,042,867 | B2 * | 10/2011 | Meister | B64D 11/06 |
| | | | | 297/216.15 |
| 9,580,174 | B2 * | 2/2017 | Berti | B64D 11/064 |
| 2003/0080597 | A1 | 5/2003 | Beroth et al. | |
| 2006/0061182 | A1 * | 3/2006 | Park | B60N 2/22 |
| | | | | 297/378.1 |
| 2006/0119157 | A1 | 6/2006 | Itoh et al. | |
| 2011/0101748 | A1 * | 5/2011 | Goetz | A47C 3/36 |
| | | | | 297/284.4 |
| 2013/0009435 | A1 * | 1/2013 | Westerink | B60N 2/1835 |
| | | | | 297/313 |

FOREIGN PATENT DOCUMENTS

| | | | | |
|---|---|---|---|---|
| EP | 0723890 | A2 | 7/1996 | |
| EP | 0869061 | A2 * | 10/1998 | ......... B64D 11/0638 |
| EP | 3225552 | A1 | 10/2017 | |
| FR | 3074105 | A1 * | 5/2019 | ............. B60N 2/686 |
| GB | 2586143 | A * | 2/2021 | ........... B60N 2/2236 |
| WO | 200206117 | A1 | 1/2002 | |
| WO | WO-2021083754 | A1 * | 5/2021 | ......... B64D 11/0641 |

\* cited by examiner

SEAT ASSEMBLY WITH INDEPENDENT SEAT BOTTOM TILT

CROSS REFERENCE TO RELATED APPLICATIONS

This application is related to and claims priority benefits from U.S. Provisional Application Ser. No. 62/677,950 ("the '950 application"), filed on May 30, 2018, entitled SEAT ASSEMBLY WITH SEAT BOTTOM THAT TILTS DOWNWARD. The '950 application is hereby incorporated in its entirety by this reference.

FIELD OF THE DISCLOSURE

The field of the disclosure relates to passenger seat adjustment mechanisms.

BACKGROUND

Safety, comfort, and weight are among the driving concerns for passenger amenities, particularly in the context of aircraft furnishings. For example, amenities should protect the passenger against injury during an impact event, should be comfortable and adjustable, and should meet ergonomic requirements for passengers on long flights. For very long flights, space constraints can make passenger comfort a particular challenge. Best practices for health and comfort suggest that passengers should regularly move and stretch to avoid soreness and tiredness, and to improve circulation. However, moving about the cabin is not always possible or convenient during flight, and existing adjustment mechanisms for allowing passengers to recline or change positions can fall short when space is constrained. To that end, novel approaches to passenger comfort are needed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a passenger seat includes a seat frame, a seat back connected to the seat frame, and a seat bottom connected to the seat frame by a hinge at an aft portion of the seat bottom. The seat back and seat bottom can both be independently capable of pivoting with respect to the seat frame about a common axis or about two axes proximate to each other. A release mechanism is operably connected with the seat bottom where it can release the seat bottom from a locked configuration to an unlocked configuration. When unlocked, the seat bottom is free to rotate downward, independent of the seat back, about the hinge from an initial position to a tilted position. When released, the seat bottom can be returned to its initial, upright (or horizontal) position.

In some embodiments, the passenger the seat frame can include multiple crossbars for support, e.g. a first crossbar and a second crossbar below the seat bottom, with a first crossbar positioned forward of the second crossbar, and where the first crossbar is positioned at a lower height than the second crossbar to allow clearance when the seat bottom pivots. The passenger seat may be able to tilt from a substantially horizontal position to a tilted position of 10 to 15 degrees below horizontal. The seat may also include a return mechanism connected with the frame and with the seat bottom that biases the seat bottom toward the initial position such that, when the passenger seat is unweighted and the release mechanism is actuated, the return mechanism causes the seat bottom to move back to the initial position.

Embodiments may also include an independently tiltable seat back with a second attachment point and second hinge at a bottom portion of the seat back that allows the seat back to tilt aft, about the second hinge, from an upright position to a reclined position. A second release mechanism may be operably connected with the seat back or second locking hinge so that, when actuated by a user, the seat back can be reclined by allowing it to rotate aft from the upright position to the reclined position, independent of any tilt by the seat bottom. According to some embodiments, the upright position of the seat back can range from 10 to 20 degrees aft from vertical, preferably at least 16 degrees; and the reclined position can vary from 20 to 40 degrees aft from vertical, preferably at least 37.5 degrees. In some embodiments, the seat bottom and seat back can have sufficient rotational freedom that an angle between the seat bottom when fully rotated to the seat back when fully reclined is at least 130 degrees, preferably at least 142.5 degrees, and in some cases up to 180 degrees. In some embodiments, the difference between an initial angle formed by the seat bottom and seat back, when the seat bottom is in the initial position and the seat back is in the upright position, and a fully extended angle formed by the seat bottom and seat back, when the seat bottom is fully rotated and the seat back is fully reclined, may be from 30 to 45 degrees, preferably at least 39 degrees, or more.

According to certain embodiments of the present disclosure a rotatable seat bottom assembly for a passenger seat can include a first hinge connected with the seat bottom at an aft portion of the seat bottom and configured to attach to a passenger seat frame, and a release mechanism connected with the seat bottom or first hinge to release the seat bottom from a locked configuration to an unlocked configuration. When the release mechanism is actuated, the seat bottom is free to rotate downward about the first hinge from an initial position to a tilted position.

In some embodiments, a rotatable seat bottom assembly can include a supportive cushion positioned at a forward portion of the seat bottom that is thicker than a remainder of the seat bottom and designed to help support a passenger who has tilted the seat bottom assembly and to prevent them from sliding off the seat. The seat bottom assembly may also include a return mechanism connected with the seat bottom that biases the seat bottom upward when the seat bottom is released to the unlocked position. The actuator for the release mechanism can take any suitable form, but can include, e.g., a pushbutton actuator, lever, or switch; and the release mechanism can be any suitable mechanical actuator, such as a cable-based actuator, hydraulic actuator, or the like. According to some embodiments, the release mechanism is operable to lock the seat bottom at any angle of a continuous range in the tilted configuration, or can lock the seat bottom at a set of discrete angles. In some embodiments, the seat bottom can rotate up to 15 degrees below horizontal in the tilted configuration, typically from an initial position that is approximately horizontal.

According to certain embodiments of the present disclosure, a method of adjusting a seat bottom angle for a seat includes, with a passenger seat including any of the features described above: actuating the release mechanism to free the seat bottom to rotate downward about a hinge independent of the seat back, rotating the seat bottom from an initial position to a tilted position, and disengaging the release mechanism to lock the seat bottom in the tilted position. In some embodiments, where the seat bottom and seat back can be independently rotated, the method can further include actuating a second release mechanism, different from the first release mechanism, to free the seat back to rotate, independent of the seat bottom, about a second hinge. The seat back can be rotated aft from an upright position to a reclined position, and locked in place by disengaging the second release mechanism to lock the seat back at the reclined position. The seat bottom can be released and allowed to return to the initial position by actuating the release mechanism when the seat bottom is in the tilted position and causing the seat bottom to revert from the tilted position to the initial position by unweighting the seat bottom when the release mechanism is actuated.

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the disclosure provide an independently tilting seat bottom assembly for passenger seats that can be used with, or without, a reclining seat back. While the independently tiling seat bottom assemblies are discussed for use with aircraft seats, they are by no means so limited. Rather, embodiments of the independently tilting seat bottom assembly may be used in passenger seats or other seats of any type or otherwise as desired.

Figure 1A:
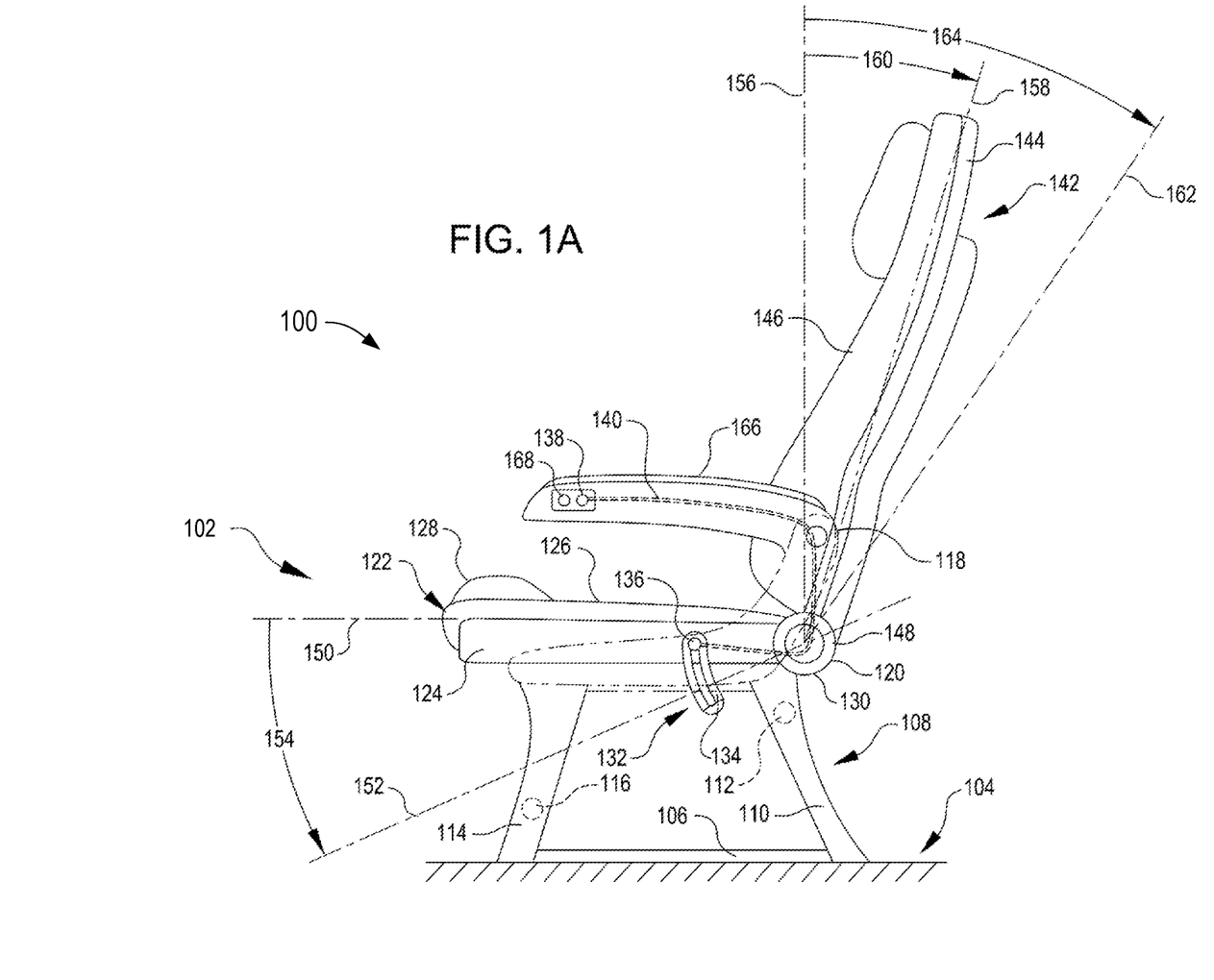
FIG. 1A is a side view of a first example of a passenger seat with an independently tilting seat bottom, in accordance with certain embodiments of the present invention.

According to certain embodiments of the present disclosure, as shown in FIG. 1A, a passenger seat assembly 100 can include a passenger seat 102 connected with a passenger compartment floor 104, either directly or via connecting elements such as a rail 106. The passenger seat 102 includes a seat frame 108, generally including rear legs 110 connected by a rear crossbar 112 and forward legs 114 connected by a forward crossbar 116, and a passenger seat body 118 connected with the legs. Various configurations of seat frames are possible within the scope of this disclosure. In some embodiments, the forward crossbar 116 can be positioned lower that the rear crossbar 112, in order to provide clearance for the seat bottom assembly 122. The passenger seat body 118 is connected with the seat bottom assembly 122 and seat back 142 by a hinge assembly 120 that allows one or both of the seat bottom and seat back to pivot with respect to the passenger seat body.

According to various embodiments, the seat bottom assembly 122 includes a seat bottom frame 124 connected with a seat bottom cushion 126. The seat bottom frame is configured to support the weight of a user, and is typically oriented horizontally, although various initial orientations are possible. Often, passenger seat bottoms are slightly inclined in an initial orientation. In some embodiments, the seat bottom cushion 126 can include features for helping to retain a passenger, particularly when the seat bottom is tilted downward, such as an additional support 128 near a forward end of the seat bottom, opposite the seat bottom hinge 130. The additional support 128 may assist a passenger in remaining comfortably seated while tilting the seat bottom assembly 122 by providing a shelf that prevents sliding.

The seat bottom assembly 122 is connected at an aft end of the seat bottom frame 124 with the passenger seat body 118 by way of the seat bottom hinge 130. The seat bottom hinge 130 is rotatably connected with the hinge assembly 120 of the passenger seat body 118, and is operable to allow the seat bottom to pivot downward around the seat bottom hinge when the seat bottom assembly is released to tilt. The seat bottom assembly 122 further includes a seat bottom release mechanism 132 that facilitates the tilt. The seat bottom release mechanism 132 allows the seat bottom assembly 122 to pivot downward around the seat bottom hinge 130 when released, and locks the seat bottom in place otherwise.

In some embodiments, the seat bottom release mechanism 132 may include a curved track 134 configured to mate with a movable locking pin 136 that can be actuated by way of a seat bottom actuator 138. When in use, the seat bottom assembly 122 can tilt downward about the seat bottom hinge 130 under the force of a user's weight, and can then remain in position when a user releases the seat bottom actuator 138. When locked, the locking pin 136 of the release mechanism 132 interferes with the track 134, either by way of friction or by way of interfering with surface features of the track, to prevent the seat bottom assembly 122 from moving. When released, the locking pin 136 disengages with the track 134 and allows the seat bottom assembly 122 to freely rotate. Various positions and configurations of locking mechanisms are possible and known in the art, such as ratchet-based locking mechanisms and hydraulic locking mechanisms, and including locking mechanisms that can be included in the hinge assembly 120.

In some embodiments the seat bottom actuator 138 can include a pushbutton actuator, switch, lever, or the like, which can be connected to the release mechanism 132 by way of any suitable mechanical connector, e.g. a cable control mechanism 140, though other controllers both mechanical and electronic are possible and known in the field. The seat bottom actuator 138 can be located in, e.g. the arm rest 166, or may be positioned elsewhere along the passenger seat 102, including the seat bottom frame 124, passenger seat body 118, or seat back 142. In some embodiments, the seat bottom assembly 122 can also include a return mechanism (not shown) that is biased against gravity to return the seat bottom assembly to its initial position when the seat bottom actuator 138 is depressed and when the seat bottom assembly is unweighted.

According to various embodiments of the present disclosure, passenger seat 102 can also include a tilting seat back 142. A seat back 142 includes a seat back body 144 connected to a seat back cushion 146, and the seat back may be connected with the passenger seat body 118 by way of a seat back hinge 148, which may be proximate to or may be coaxial with the seat bottom hinge 130.

When the passenger seat 102 is in use, the seat bottom assembly 122 typically rests at an initial position 150, which may be horizontal or slightly inclined. The seat bottom assembly 122 can be tilted downward after release of the release mechanism 132, e.g. by seat bottom actuator 138, by a user pressing down on the seat bottom or by a user's weight, as far as a fully tilted position 152. The seat bottom assembly 122 can then pivot at the seat bottom hinge 130 across a seat bottom tilt range 154. In some embodiments, the seat bottom tilt range 154 can be 10 to 15 degrees, or up to 15 degrees below horizontal.

According to various embodiments, the seat back 142 may also pivot to allow a passenger to recline. For example, the seat back 142 in an upright position can rest at an initial, upright position 158, typically just aft of a vertical axis 156. The initial seat back angle 160 at the upright position 158 may be from about 10 to 20 degrees, or from 15 to 20 degrees, or preferably about 16 degrees. The seat back can continuously recline between the initial, upright position 158 and a fully reclined position 162 at a second, fully reclined angle 164. Mechanisms for enabling a reclining seat back are known in the art, and can be similar to the mechanisms described above for enabling the seat bottom assembly 122 to tilt. A second, seat back actuator 168 can be positioned in the arm rest 166 to release the seat back 142 to tilt or return upright. In some embodiments, the fully reclined angle 164 to which the seat back 142 may recline can be 20 to 40 degrees aft from the vertical axis 156, preferably 30 to 40 degrees, preferably at least 37.5 degrees. A fully reclined range 170 for the passenger seat 102, including a fully tilted seat bottom assembly 122 and a fully reclined seat back 142, may be in the range of 120 to 180 degrees, preferably at least 130 degrees, more preferably at least 142.5 degrees. In some embodiments, a difference between the fully reclined range 170 and an initial, upright, and fully stowed range 170 (corresponding to an upright seat back 142 and seat bottom assembly 122) may be up to 60 degrees, preferably from 30 to 45 degrees, more preferably at least 39 degrees.

Figure 1B:
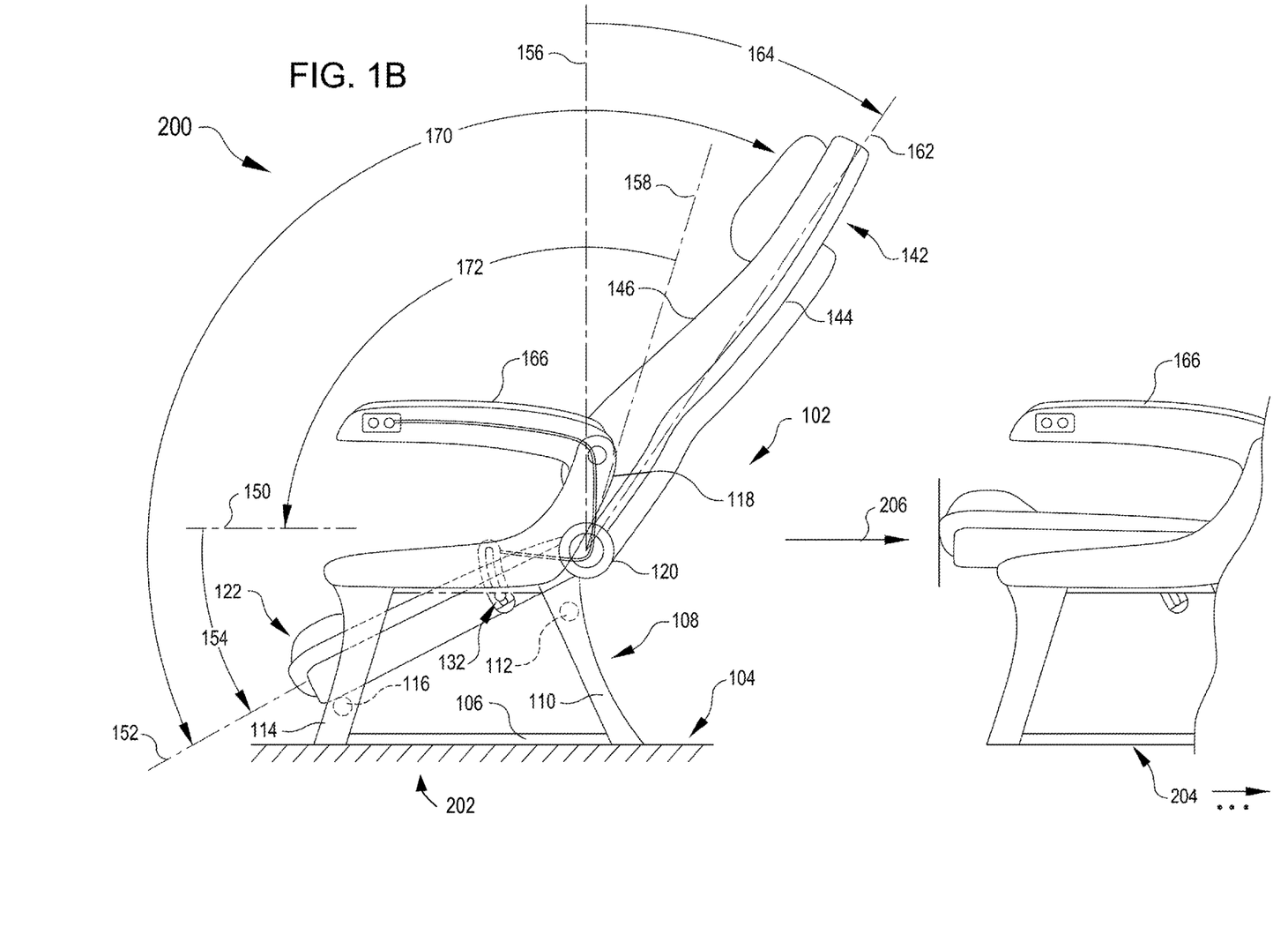
FIG. 1B is a side view showing the passenger seat of FIG. 1A in a fully reclined and tilted configuration.

FIG. 1B is a side view showing an arrangement of seats 200 that includes the passenger seat 102 of FIG. 1A in a fully reclined and tilted configuration. The passenger seat 102, as positioned in a first seat row 202 of the arrangement of seats 200, may be spaced apart form a second seat row 204 by a nonzero clearance 206 when the seat back 142 is fully reclined. In some embodiments, the clearance 206 may not be present, i.e. the seat back 142 may extend beyond a distance between the two seats when reclined. Importantly, the tilting seat bottom assembly 122 does not require significant additional clearance, and permits the passenger to selectively adopt a more open posture at the hips in order to stretch out in place.

Various parts of the seat bottom assembly 122, seat back 142, and connecting components may be formed of materials including but not limited to aluminum, stainless steel, aramid fibers, polycarbonate, polypropylene, other metallic materials, composite materials, or other similar materials. The passenger seat body 118 and legs 110, 114 are typically metal components, but may also vary in construction and may include polymer or composite coverings. Cushioning elements such as the seat back cushion 146, seat bottom cushion 126 and additional support 128 may include foamed or elastomeric layers for providing compressibility. Components may be connected to each other way of any suitable fasteners, which include but are not limited to screws, bolts, rivets or other mechanical or chemical fasteners.

Figure 2A:
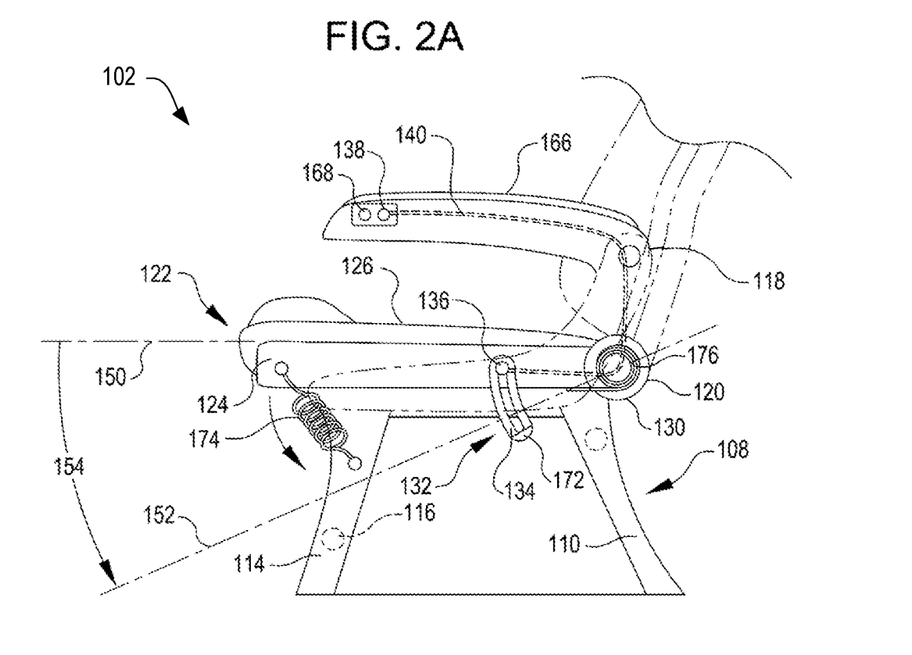
FIG. 2A is a detailed side view showing the seat bottom release mechanism of the passenger seat of FIG. 1A.

FIG. 2A is a detailed side view showing the seat bottom release mechanism 132 of the passenger seat 102 of FIG. 1A, in accordance with at least one embodiment. The passenger seat 102 includes seat frame 108 having rear legs 110 and forward legs 114, and a passenger seat body 118 connected with the legs. The passenger seat body 118 is connected with the seat bottom assembly 122 by a hinge assembly 120. The hinge assembly 120 is rotatably connected with a seat bottom hinge 130 that allows the seat bottom frame 124 to pivot with respect to the passenger seat body 118.

Figure 2B:
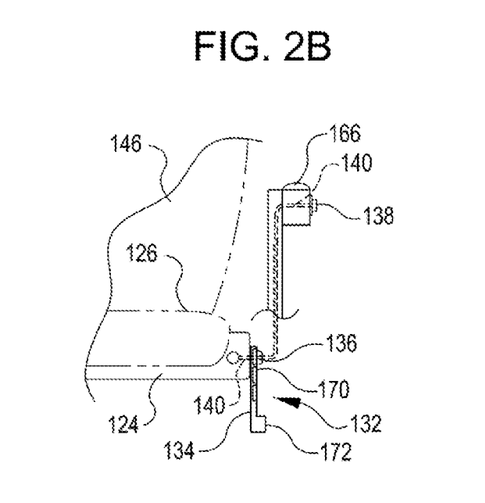
FIG. 2B is a detailed front view showing the seat bottom release mechanism of FIG. 2A.

In operation, when the seat bottom assembly 122 is tilted downward about the seat bottom hinge 130, locking pin 136 of the release mechanism 132 interferes with the track 134, either by way of friction or by way of interfering with surface features of the track, to prevent the seat bottom assembly 122 from moving. When released, the locking pin 136 disengages with the track 134 and allows the seat bottom assembly 122 to freely rotate. In some embodiments, a series of voids 173 may receive the locking pin 136 to provide rigid support, or travel of the seat bottom assembly 122 may be arrested by a stop feature 172, as shown in FIG. 2B. In addition, the seat bottom assembly 122 may be biased to return to the initial position 150 by one or more spring elements, such as a linear spring 174 connected with the seat bottom frame 124, or by a rotary spring 176 connected with the seat bottom hinge 130.

Figure 3A:
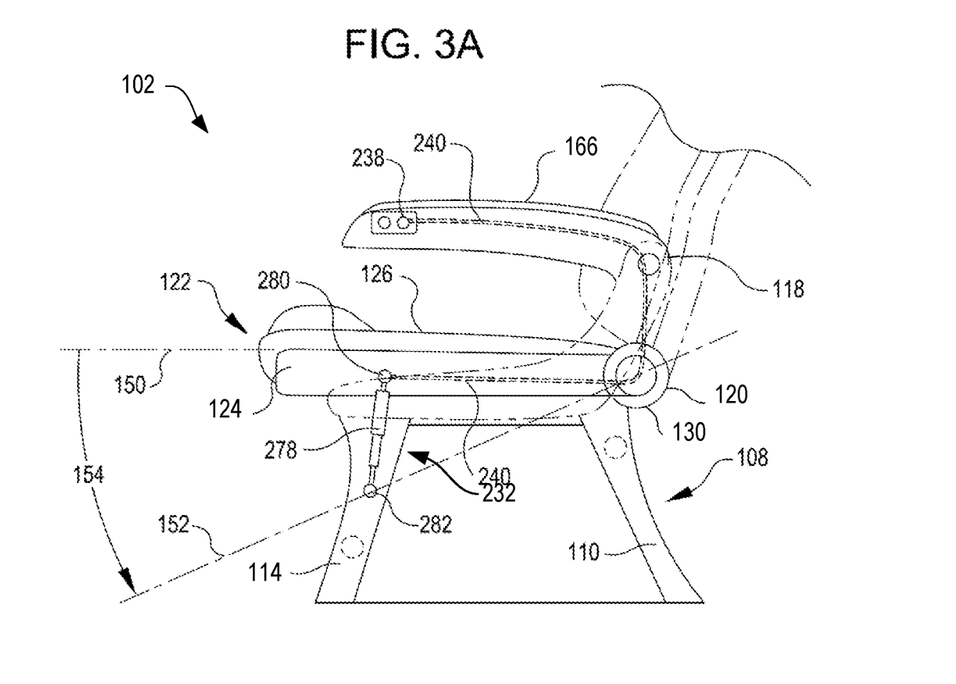
FIG. 3A is a detailed side view showing a second example of a seat bottom release mechanism compatible with the passenger seat of FIG. 1A.

FIG. 3A is a detailed side view showing a second example of a seat bottom release mechanism 232 compatible with the passenger seat 102 of FIG. 1A. As discussed above, the passenger seat 102 includes seat frame 108 having rear legs 110 and forward legs 114, and a passenger seat body 118 connected with the legs. The passenger seat body 118 is connected with the seat bottom assembly 122 by a hinge assembly 120. The hinge assembly 120 is rotatably connected with a seat bottom hinge 130 that allows the seat bottom frame 124 to pivot with respect to the passenger seat body 118.

According to various embodiments, the seat bottom assembly 122 may include a seat bottom release mechanism 232 that facilitates the tilt. The seat bottom release mechanism 232 allows the seat bottom assembly 122 to pivot downward around the seat bottom hinge 130 when released, and locks the seat bottom in place otherwise. The seat bottom release mechanism 232 can be released to allow tilting by way of a seat bottom actuator 238 positioned in the arm rest 166, similar to seat bottom actuator 138 described above.

In some embodiments, the seat bottom release mechanism 232 may include a compressible support 278 that can actuate in order to allow the seat bottom frame 124 to move up and down at the forward end. When the compressible support 278 is allowed to compress, e.g. by a user pressing the seat bottom actuator 238, the seat bottom assembly 122 can tilt downward about the seat bottom hinge 130 under the force of a user's weight, and can then remain in position when a user releases the seat bottom actuator 238. The compressible support 278 may be biased against downward motion by the seat bottom assembly 122 so that, when released and unweighted, the compressible support 278 can push the seat bottom assembly 122 upward, back to the initial configuration.

Figure 3B:
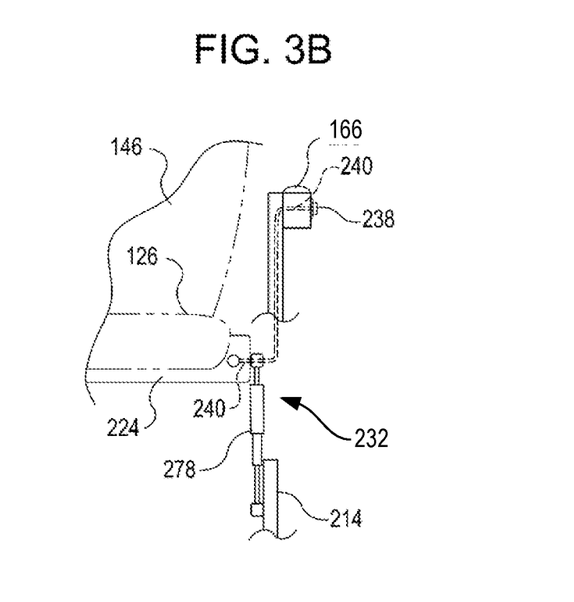
FIG. 3B is a detailed front view showing the seat bottom release mechanism of FIG. 3A.

In some embodiments the seat bottom actuator 238 can include a pushbutton actuator, switch, lever, or the like, which can be connected to the release mechanism 132 by way of any suitable mechanical connector, e.g. a cable control mechanism 240, though other controllers both mechanical and electronic are possible and known in the field. In some embodiments, the seat bottom assembly 122 can also include an additional return mechanism (not shown) such as a spring or actuator that is biased against gravity to return the seat bottom assembly to its initial position when the seat bottom actuator 238 is depressed and when the seat bottom assembly is unweighted. FIG. 3B is a detailed front view showing aspects the seat bottom release mechanism 232 of FIG. 3A. In some embodiments, the cable control mechanism 240 can pass through the seat bottom hinge 130 to connect with the compressible support 278, or may alternatively connect with the compressible support outside the seat bottom assembly 122.

Although multiple specific embodiments of release mechanisms have been described above, it will be understood by persons of skill in the art that a variety of release mechanisms may be used without departing from the spirit of this disclosure. For example, various release mechanisms may be used similar to conventional release mechanisms available for reclining seat backs or the like, which are known in the art.

Figure 4:
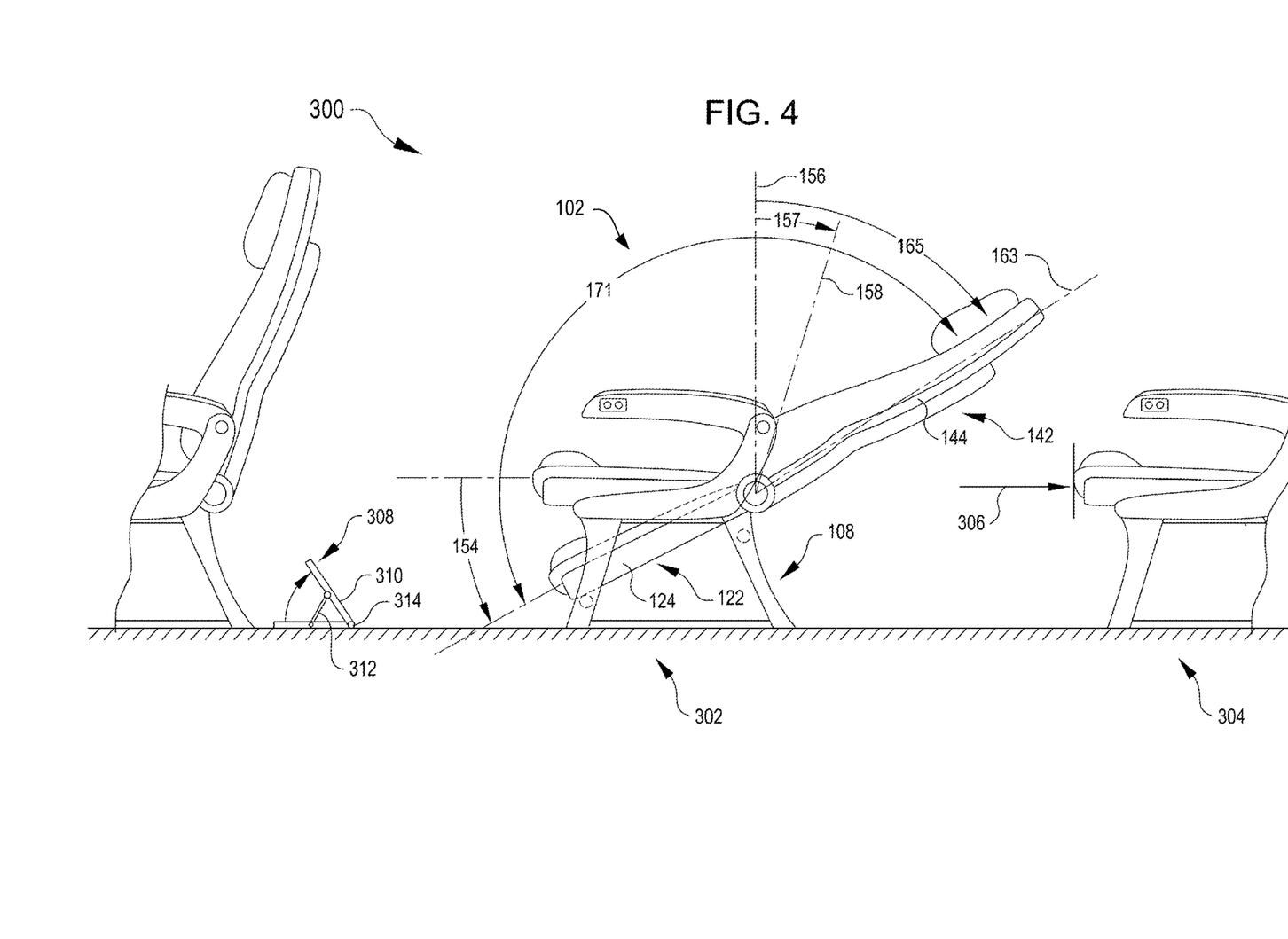
FIG. 4 is a side view of a second example of the passenger seat of FIG. 1A with independently tilting seat bottom and seat back in a fully reclined configuration.

FIG. 4 is a side view showing an expanded arrangement of seats 300 that includes the passenger seat 102 of FIG. 1A in a fully reclined and tilted configuration, with a first seat row 302 separated from a second seat row 304 by a clearance 306 suitable for permitting fully reclined and tilted passenger seats without impinging on passenger comfort. A nonzero clearance 306 may be present between the seat back 142 of the first row 302 and the passenger seat 102 of the second row 304 when the seat back 142 is fully reclined. In some embodiments, the clearance 306 may not be present, i.e. the seat back 142 may extend beyond a distance between the two seats when reclined. As discussed above, in some embodiments, the passenger seat 102 (FIGS. 1A-3B) can independently tilt at the seat bottom assembly 122 and/or recline at the seat back 142, up to a fully open (i.e., tilted and reclined) angle of at least 120 degrees, preferably at least 130 degrees, more preferably at least 142.5 degrees. In some embodiments, as shown in FIG. 4, the passenger seat 102 with independently tilting seat bottom and seat back can fully open to an angle 171 greater than 142.5 degrees, or up to 180 degrees, with the seat back 142 in a fully reclined configuration 165 and the seat bottom assembly 122 when fully tilted, which may be 10-15 degrees below horizontal.

In some embodiments, the arrangement of seats 300 can include additional features for supporting a passenger when a seat 102 has been fully tilted at the seat bottom assembly 122. For example, in some embodiments, a seat arrangement can include an additional footrest assembly 308, which may be positioned in front of the passenger seat 102. A footrest assembly can include, e.g. a platform 310, and may be positioned permanently upright, or may be retractable, e.g. with a retractable support 312 and hinge 314.

In the following, further examples are described to facilitate the understanding of the disclosure:

Example A. A passenger seat, comprising: a seat frame; a seat back connected to the seat frame at a first attachment point; a seat bottom connected to the seat frame at a second attachment point proximate to the first attachment point, the second attachment point comprising a first hinge at an aft portion of the seat bottom; and a release mechanism operably connected with the seat bottom or first hinge and operable, when actuated by a user, to release the seat bottom from a locked configuration to an unlocked configuration, wherein the seat bottom is free to rotate downward, independent of the seat back, about the first hinge from an initial position to a tilted position when released to the unlocked configuration.

Example B. The passenger seat of any of the preceding or subsequent examples, wherein the seat frame comprises a first crossbar and a second crossbar below the seat bottom, the first crossbar positioned forward of the second crossbar, wherein the first crossbar is positioned at a lower height than the second crossbar.

Example C. The passenger seat of any of the preceding or subsequent examples, wherein the tilted position is 10 to 15 degrees below horizontal.

Example D. The passenger seat of any of the preceding or subsequent examples, further comprising a return mechanism connected with the frame and with the seat bottom that biases the seat bottom toward the initial position such that, when the passenger seat is unweighted and the release mechanism is actuated, the return mechanism causes the seat bottom to move to the initial position.

Example E. The passenger seat of any of the preceding or subsequent examples, wherein the second attachment point comprises a second hinge at a bottom portion of the seat back and proximate to the first hinge; and the seat back is operable to tilt aft, about the second hinge, from an upright position to a reclined position.

Example F. The passenger seat of any of the preceding or subsequent examples, further comprising: a second release mechanism operably connected with the seat back or second locking hinge and operable, when actuated by a user, to release the seat back from a second locked configuration to a second unlocked configuration whereby the seat back is free to rotate aft from the upright position to the reclined position.

Example G. The passenger seat of any of the preceding or subsequent examples, wherein the upright position is from 10 to 20 degrees aft from vertical, preferably at least 16 degrees; and wherein the reclined position is from 20 to 40 degrees aft from vertical, preferably at least 37.5 degrees.

Example H. The passenger seat of any of the preceding or subsequent examples, wherein the first locking hinge and second hinge are coaxial.

Example I. The passenger seat of any of the preceding or subsequent examples, wherein an angle between the seat bottom when fully rotated to the seat back when fully reclined is at least 130 degrees, preferably at least 142.5 degrees.

Example J. The passenger seat of any of the preceding examples, wherein a difference between an initial angle formed by the seat bottom and seat back, when the seat bottom is in the initial position and the seat back is in the upright position, and a fully extended angle formed by the seat bottom and seat back, when the seat bottom is fully rotated and the seat back is fully reclined, is 30 to 45 degrees, preferably at least 39 degrees.

Example K. A rotatable seat bottom assembly for a passenger seat, the assembly comprising: a seat bottom; a first hinge connected with the seat bottom at an aft portion of the seat bottom and configured to attach to a passenger seat frame; and a release mechanism operably connected with the seat bottom or first hinge and operable, when actuated by a user, to release the seat bottom from a locked configuration to an unlocked configuration, wherein the seat bottom is free to rotate downward about the first hinge from an initial position to a tilted position when the release mechanism is released to the unlocked configuration.

Example L. The assembly of any of the preceding or subsequent examples, wherein the seat bottom comprises a supportive cushion positioned at a forward portion of the seat bottom that is thicker than a remainder of the seat bottom.

Example M. The assembly of any of the preceding or subsequent examples, further comprising a return mechanism connected with the seat bottom that biases the seat bottom upward when the seat bottom is released to the unlocked position.

Example N. The assembly of any of the preceding or subsequent examples, wherein the release mechanism further comprises a pushbutton actuator.

Example O. The assembly of any of the preceding or subsequent examples, wherein the release mechanism is operable to lock the seat bottom at any angle of a continuous range in the tilted configuration.

Example P. The assembly of any of the preceding or subsequent examples, wherein the seat bottom can rotate up to 15 degrees below horizontal in the tilted configuration.

Example Q. The assembly of any of the preceding examples, wherein the initial position is approximately horizontal.

Example R. A method of adjusting a seat bottom angle, the method comprising:
with a seat comprising a seat frame, a seat back connected to the seat frame at a first attachment point, and a seat bottom connected to the seat frame at a second attachment point proximate to the first attachment point, the second attachment point comprising a first hinge at an aft portion of the seat bottom, and a release mechanism operably connected with the seat bottom or first hinge: actuating the release mechanism to free the seat bottom is to rotate downward, independent of the seat back, about the first hinge; rotating the seat bottom about the first hinge from an initial position to a tilted position below the initial position while the release mechanism is actuated; and disengaging the release mechanism to lock the seat bottom in the tilted position.

Example S. The method of the preceding or subsequent examples, further comprising: actuating a second release mechanism, different from the first release mechanism, to free the seat back to rotate, independent of the seat bottom, about a second hinge at the first attachment point; rotating the seat back aft from an upright position to a reclined position; and disengaging the second release mechanism to lock the seat back at the reclined position.

Example T. The method of any of the preceding examples, further comprising: actuating the release mechanism when the seat bottom is in the tilted position; and causing the seat bottom to revert from the tilted position to the initial position by unweighting the seat bottom when the release mechanism is actuated.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A passenger seat, comprising:
a seat frame;
a seat bottom;
a first hinge connected with the seat bottom at an aft portion of the seat bottom, wherein the first hinge is attached to the seat frame so that a first pivot axis of the first hinge is fixed relative to the seat frame, wherein the seat bottom is operable to rotate, about the first hinge, between an initial position and a tilted position;
a seat back;
a second hinge connected with the seat back at a bottom portion of the seat back, wherein the second hinge is attached to the seat frame so that a second pivot axis of the second hinge is fixed relative to the seat frame and coaxial with the first pivot axis of the first hinge, wherein the seat back is operable to tilt aft, about the second hinge, from an upright position to a reclined position; and
a release mechanism operably connected with the seat bottom or first hinge and operable, when actuated by a user, to release the seat bottom from a locked configuration to an unlocked configuration, wherein the seat bottom is free to rotate downward, independent of the seat back, about the first hinge from the initial position to the tilted position when released to the unlocked configuration.

2. The passenger seat of claim 1, wherein the seat frame comprises a first crossbar and a second crossbar below the seat bottom, the first crossbar positioned forward of the second crossbar, wherein the first crossbar is positioned at a lower height than the second crossbar.

3. The passenger seat of claim 1, wherein the tilted position is 10 to 15 degrees below horizontal.

4. The passenger seat of claim 1, further comprising a return mechanism connected with the seat frame and with the seat bottom that biases the seat bottom toward the initial position such that, when the passenger seat is unweighted and the release mechanism is actuated, the return mechanism causes the seat bottom to move to the initial position.

5. The passenger seat of claim 1, further comprising:
a second release mechanism operably connected with the seat back or second locking hinge and operable, when actuated by a user, to release the seat back from a second locked configuration to a second unlocked configuration whereby the seat back is free to rotate aft from the upright position to the reclined position.

6. The passenger seat of claim 1, wherein the upright position is from 10 to 20 degrees aft from vertical, preferably at least 16 degrees; and wherein the reclined position is from 20 to 40 degrees aft from vertical, preferably at least 37.5 degrees.

7. The passenger seat of claim 1, wherein the release mechanism includes a curved track configured to mate with a movable locking pin that can be actuated by way of a seat bottom actuator, so that when locked, the locking pin of the release mechanism interferes with the track, either by way of friction or by way of interfering with surface features of the track, to prevent the seat bottom from moving, and when released, the locking pin disengages with the track and allows the seat bottom to freely rotate.

8. The passenger seat of claim 1, wherein an angle between the seat bottom when fully rotated to the seat back when fully reclined is at least 130 degrees, preferably at least 142.5 degrees.

9. The passenger seat of claim 1, wherein a difference between an initial angle formed by the seat bottom and seat back, when the seat bottom is in the initial position and the seat back is in the upright position, and a fully extended angle formed by the seat bottom and seat back, when the seat bottom is fully rotated and the seat back is fully reclined, is 30 to 45 degrees, preferably at least 39 degrees.

10. A rotatable seat bottom assembly for a passenger seat, the assembly comprising:
- a seat bottom;
- a first hinge connected with the seat bottom at an aft portion of the seat bottom, wherein the first hinge is attached to a passenger seat frame so that a first pivot axis of the first hinge is fixed relative to the seat frame;
- a second hinge attached to the seat frame so that a second pivot axis of the second hinge is fixed relative to the seat frame and coaxial with the first pivot axis of the first hinge, wherein the second hinge is configured to attach to a seat back at a bottom portion of the seat back so that the seat back is operable to tilt aft, about the second hinge, from an upright position to a reclined position; and
- a release mechanism operably connected with the seat bottom or first hinge and operable, when actuated by a user, to release the seat bottom from a locked configuration to an unlocked configuration, wherein the seat bottom is free to rotate downward about the first hinge from an initial position to a tilted position when the release mechanism is released to the unlocked configuration.

11. The assembly of claim 10, wherein the seat bottom comprises a supportive cushion positioned at a forward portion of the seat bottom that is thicker than a remainder of the seat bottom.

12. The assembly of claim 10, further comprising a return mechanism connected with the seat bottom that biases the seat bottom upward when the seat bottom is released to the unlocked configuration.

13. The assembly of claim 10, wherein the release mechanism further comprises a pushbutton actuator.

14. The assembly of claim 10, wherein the release mechanism is operable to lock the seat bottom at any angle of a continuous range in the tilted position.

15. The assembly of claim 10, wherein the seat bottom can rotate up to 15 degrees below horizontal in the tilted position.

16. The assembly of claim 10, wherein the initial position is approximately horizontal.

17. A method of adjusting a seat bottom angle, the method comprising:
- with a seat comprising (i) a seat frame, (ii) a seat bottom connected to the seat frame at a first hinge at an aft portion of the seat bottom so that a first pivot axis of the first hinge is fixed relative to the seat frame, (iii) a seat back connected to the seat frame at a second hinge at a bottom portion of the seat back so that a second pivot axis of the second hinge is fixed relative to the seat frame and coaxial with the first pivot axis of the first hinge, and (iv) a first release mechanism operably connected with the seat bottom or first hinge:
- actuating the first release mechanism to free the seat bottom to rotate downward, independent of the seat back, about the first hinge;
- rotating the seat bottom about the first hinge from an initial position to a tilted position below the initial position while the first release mechanism is actuated; and
- disengaging the first release mechanism to lock the seat bottom in the tilted position.

18. The method of claim 17, further comprising:
- actuating a second release mechanism, different from the first release mechanism, to free the seat back to rotate, independent of the seat bottom, about the second hinge;
- rotating the seat back aft from an upright position to a reclined position; and
- disengaging the second release mechanism to lock the seat back at the reclined position.

19. The method of claim 17, further comprising:
- actuating the first release mechanism when the seat bottom is in the tilted position; and
- causing the seat bottom to revert from the tilted position to the initial position by unweighting the seat bottom when the first release mechanism is actuated.

* * * * *